May 16, 1950   F. H. McCORMICK   2,507,920
DOMESTIC APPLIANCE
Original Filed Nov. 3, 1939   9 Sheets-Sheet 1
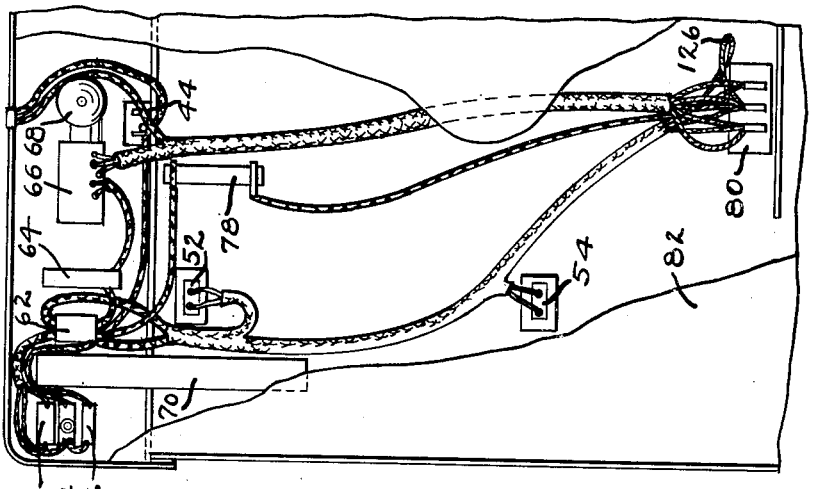
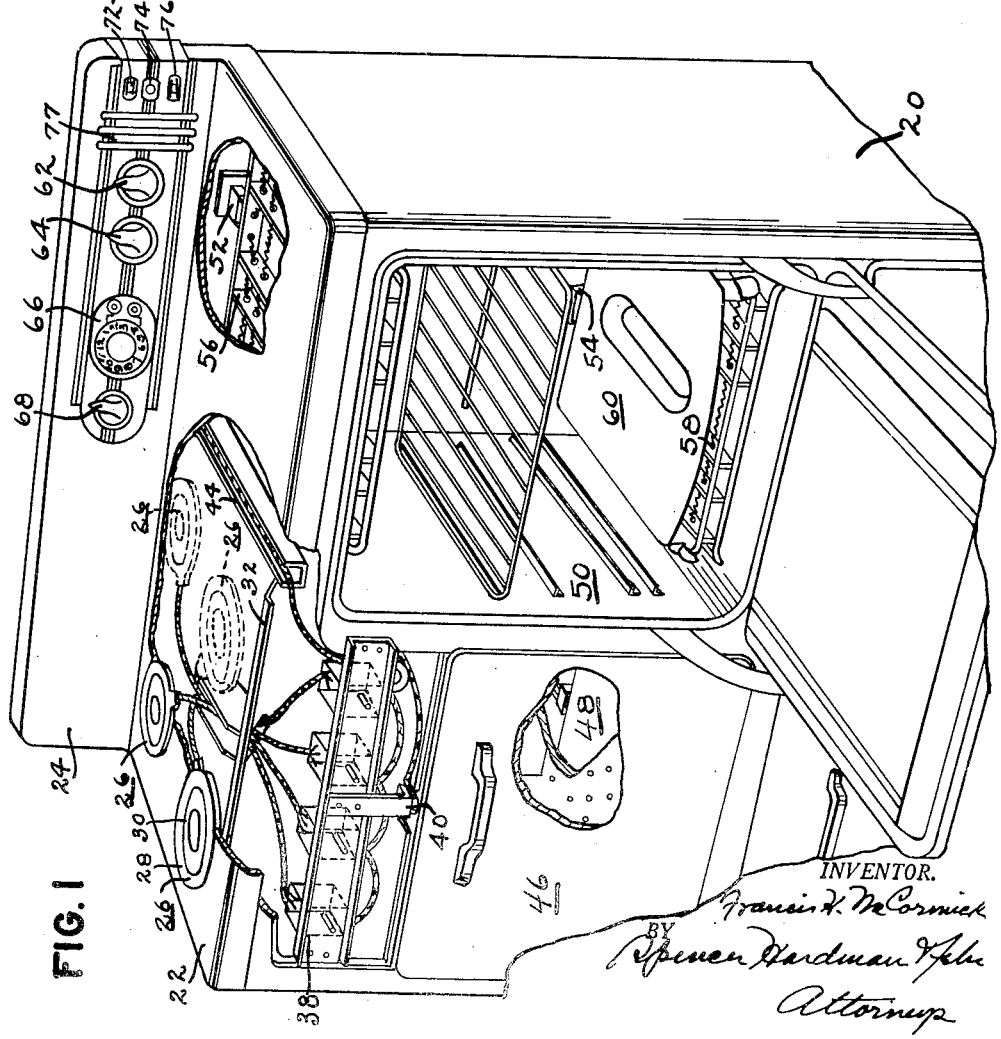
INVENTOR.
Francis H. McCormick
BY Spencer Hardman & John
Attorneys

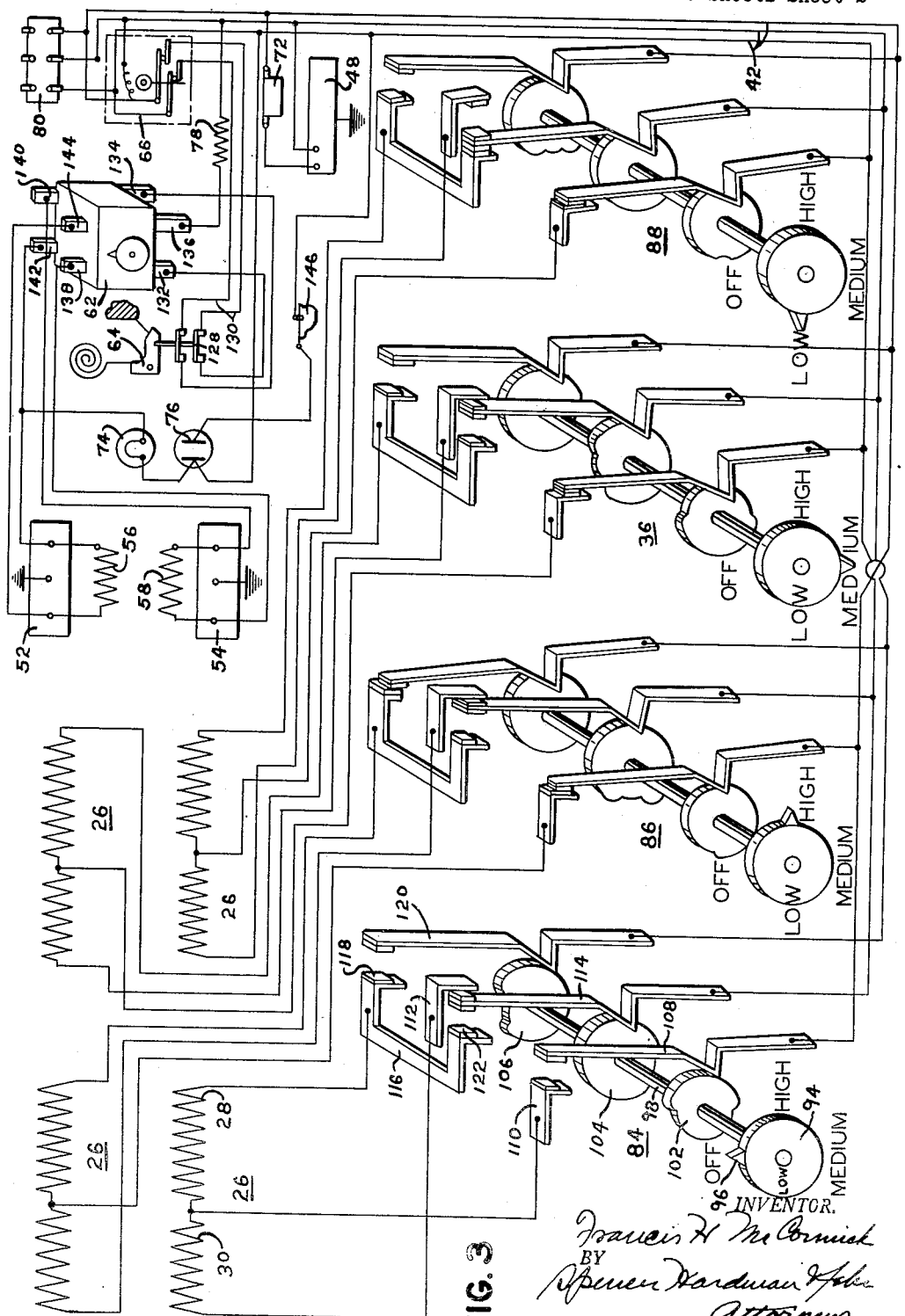

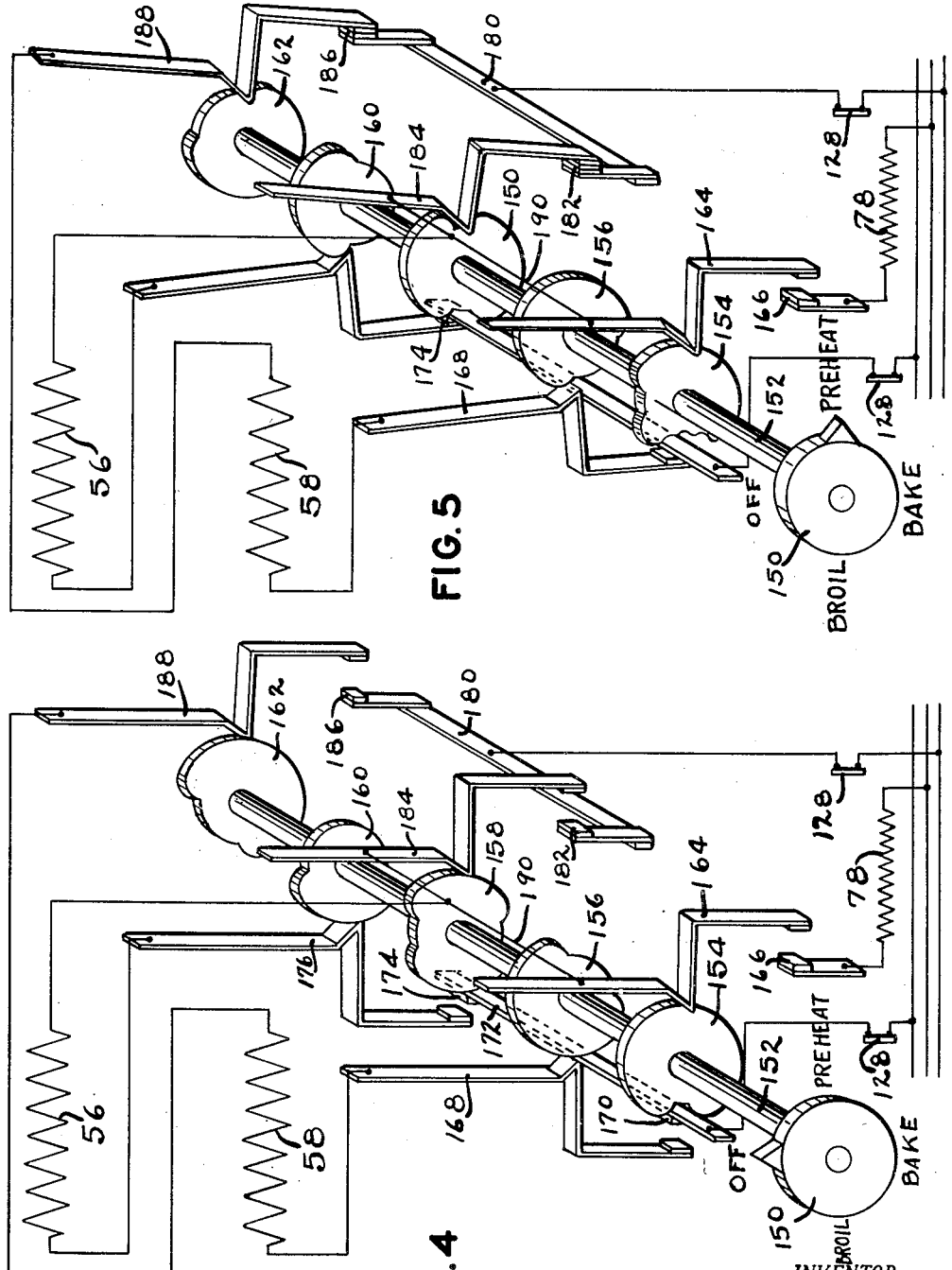

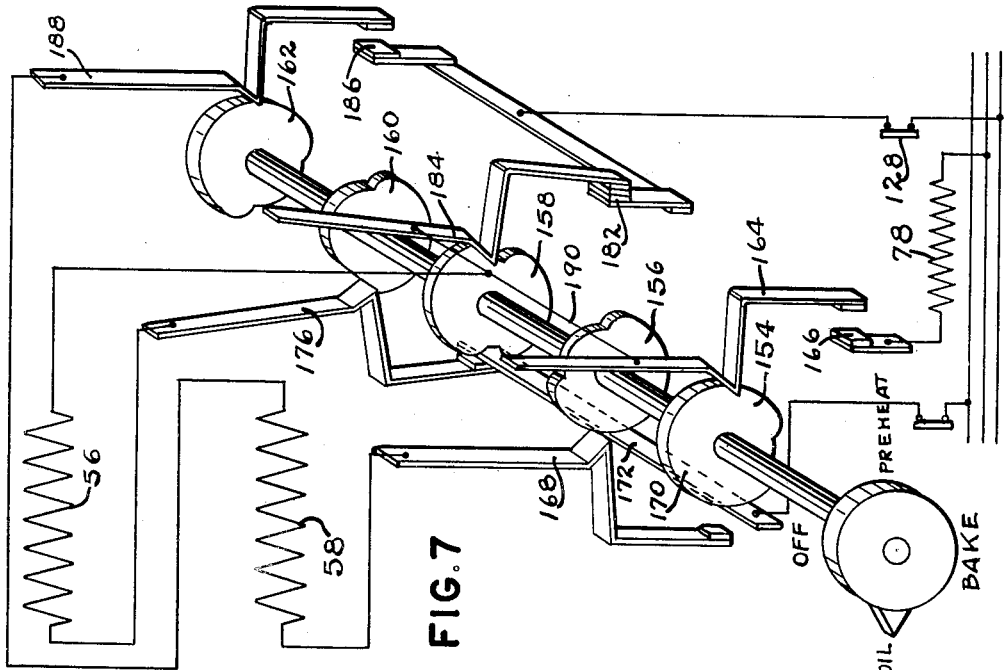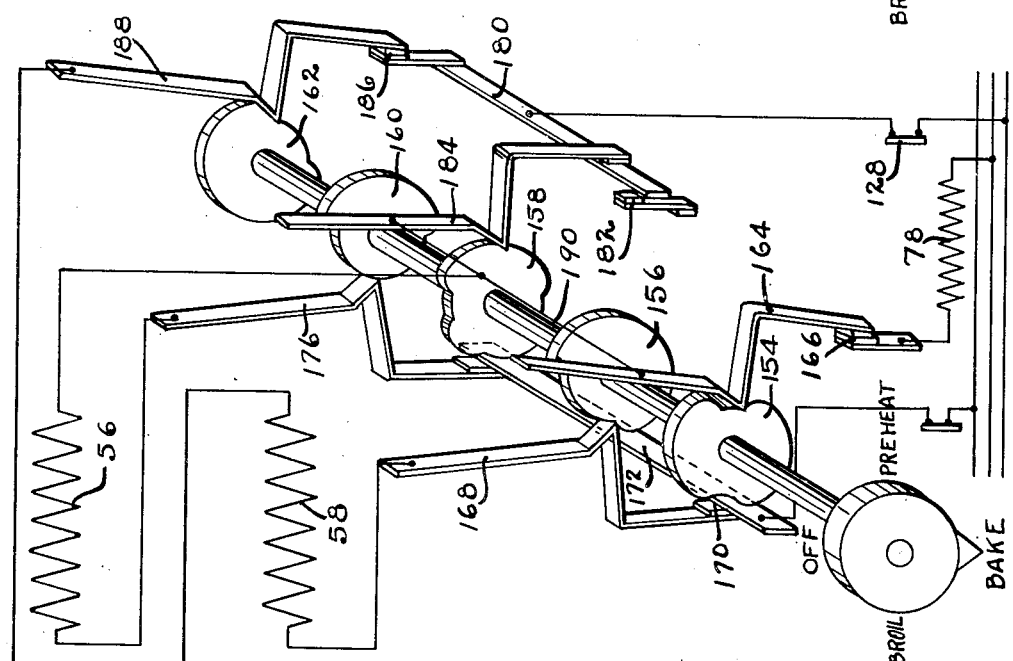

May 16, 1950     F. H. McCORMICK     2,507,920
DOMESTIC APPLIANCE

Original Filed Nov. 3, 1939     9 Sheets-Sheet 5

INVENTOR.
Francis H. McCormick
BY
Spencer Hardman Hehr
Attorneys

May 16, 1950     F. H. McCORMICK     2,507,920
DOMESTIC APPLIANCE

Original Filed Nov. 3, 1939     9 Sheets-Sheet 6

INVENTOR.
Francis H. McCormick
BY
Spencer Hardman & Faber
Attorneys

May 16, 1950 F. H. McCORMICK 2,507,920
DOMESTIC APPLIANCE
Original Filed Nov. 3, 1939 9 Sheets-Sheet 7

INVENTOR.
Francis H. McCormick
BY
Attorneys

May 16, 1950  F. H. McCORMICK  2,507,920
DOMESTIC APPLIANCE
Original Filed Nov. 3, 1939  9 Sheets-Sheet 8

May 16, 1950     F. H. McCORMICK     2,507,920
DOMESTIC APPLIANCE

Original Filed Nov. 3, 1939     9 Sheets-Sheet 9

Patented May 16, 1950

2,507,920

UNITED STATES PATENT OFFICE 2,507,920

DOMESTIC APPLIANCE

Francis H. McCormick, Oakwood, Ohio, assignor to General Motors Corporation, Dayton, Ohio, a corporation of Delaware Original application November 3, 1939, Serial No. 302,728, now Patent No. 2,442,900, dated June 8, 1948. Divided and this application March 6, 1948, Serial No. 13,462

5 Claims. (Cl. 219—20)

This invention relates to a domestic appliance and more particularly to heating arrangements in electric stoves.

This application is a division of my copending application S. N. 302,728, filed November 3, 1939 (Patent 2,442,900, June 8, 1948).

It has been found that a more uniform temperature will be attained in an oven by supplying the major portion of the heat at the bottom and a small amount of evenly distributed heat at the top of the oven. The space within the oven is made more usable by providing the broiling heater at the top of the oven. If separate heaters are provided in the top of the oven for broiling and for baking the heaters will interfere to prevent either heater from providing the desired uniform distribution.

It is an object of my invention to provide an arrangement for a heater in the upper portion of the oven which will cause the heater to supply heat uniformly at a sufficient rate for broiling when desired or at a much lesser rate when it is desired to use the oven for baking.

I have found that the inner portion of the electric surface heaters tends to become much warmer than the outside portion of such heaters, even though it has been customary to provide the heat uniformly over the surface of the heaters. One reason for this is that the outer portions of such heaters are exposed to relatively cool air as well as cooler portions of the range adjacent the heaters. Convection currents at the outer edges of the heaters carry away heat from the outer portions of the surface heaters with considerable rapidity. The inner portions of the heaters are separated from the convection currents of cool air as well as cooler portions of the range adjacent the heaters by the outer portions of the heaters, and the hot air rising from the outer portions of the heaters. This condition is frequently made worse by reason of the fact that cooking utensils often have concave bottoms and thus tend to make contact only on the outside of the heater and ordinarily remain out of contact on the inside or center. This causes most of the heat to be conducted directly from the heater to the utensil or to the outer portion thereof, while the inner portion is forced to employ some less efficient manner of heat transmission.

It is therefore an object of my invention to provide an electric surface heater in which the heating intensity increases from the inner portions to the outer portions of the surface heater.

It is another object of my invention to provide an electric surface heater formed of a plurality of concentric rings in which the outer ring has a greater density of wattage per square inch than the inner ring.

The problem of providing uniform heat distribution for a wide variety of food loads in an oven is perpetual and continuing. Apparently there is no perfect solution to the problem; but improvements are always possible and desirable. It is customary to place the main heating unit in the bottom of the oven. This, however, has a tendency to make the portion of the oven immediately above the heating unit too hot. Various forms of baffles or heat shields over the lower heating unit have been tried but I find these forms are rather ineffective and tend to trap the heat in the bottom of the oven.

It is an object of my invention to provide a heating arrangement for an electric oven which will provide a more even distribution of heat and particularly will prevent the burning of the bottom food being baked on the lower shelf in the oven.

It is another object of my invention to provide an improved baffle arrangement for the heater in the bottom of the oven which will shield the lower shelves from radiant heat and provide a gentle evenly distributed circulation of hot air in the oven but which will avoid the trapping of heat beneath the baffle.

It has been found that in order to obtain uniform temperature distribution over an area adjacent to a heating unit of radiant type, it is desirable to reduce the heat intensity adjacent the center of the heating unit and to increase the heat intensity of the edge portions of the heating unit. This is true for baking and broiling as well as surface heating units.

It is therefore another object of my invention to provide an improved arrangement of the heating means in the bottom and top of the oven to increase heat intensity at the edges of the heating means and especially at the front and rear edges in order to obtain more uniform temperature distribution.

It is still another object of my invention to provide a heating means with an improved support for the insulators of the electric resistance means.

Further objects and advantages of the present invention will be apparent from the following description, reference being had to the accompanying drawings, wherein a preferred form of the present invention is clearly shown.

In the drawings:

Fig. 1 is a perspective view of an electric stove embodying my invention;

Fig. 2 is a fragmentary rear view of an electric stove embodying my invention;

Fig. 3 is a complete wiring diagram for an electric stove shown in Figs. 1 and 2;

Fig. 4 is a wiring diagram of the oven heating system together with its control switch shown in 'off' position;

Fig. 5 is a wiring diagram of the oven heating system with the control system shown in "low" heat position;

Fig. 6 is a wiring diagram of the oven heating system with the control switch shown in baking position;

Fig. 7 is a wiring diagram of an oven heating system with the control switch shown in broiling position;

Figure 20:
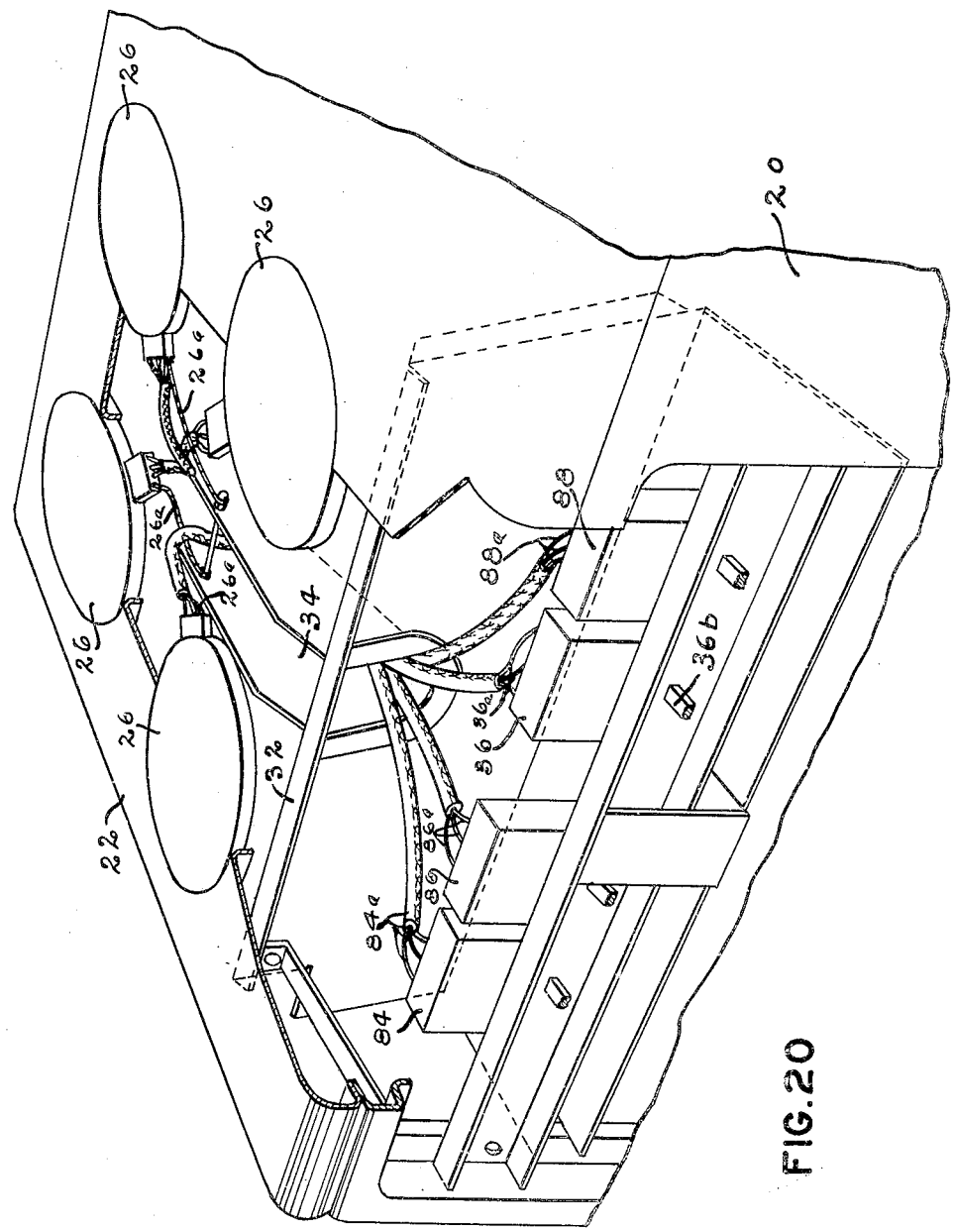

Figs. 14 to 19 inclusive are diagrammatic representations of modified forms of wiring construction;

Fig. 20 is an enlarged view of a portion of Fig. 1; and

Figure 21:
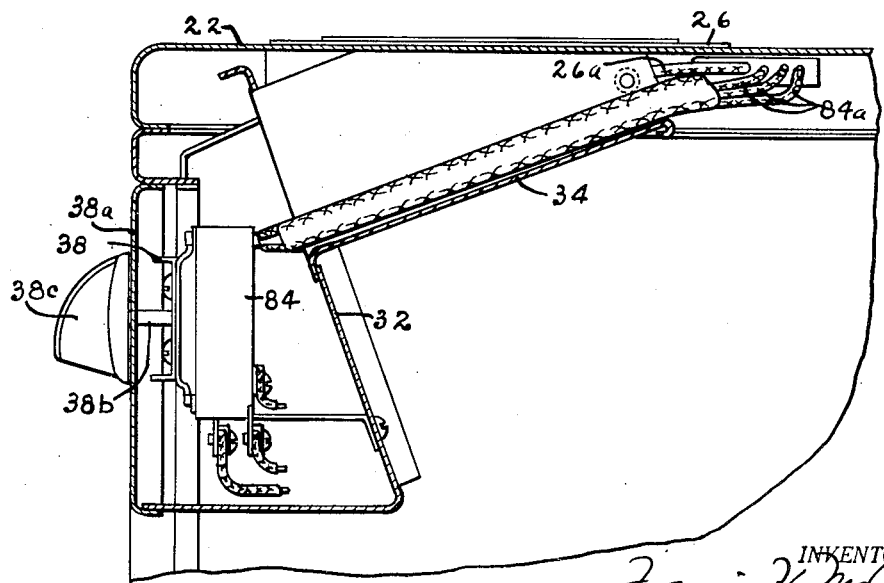

Fig. 21 is a vertical cross-sectional view taken along the center of the cable channel 34.

Briefly, I have shown an improved electric stove or range which is simple and desirable in construction. It is provided with surface heaters having two concentric heater rings and the outer heating ring has a sufficiently greater heating capacity to provide a greater heating effect per square inch than the inner ring. Preferably the outer ring has at least twice the heating energy of the inner ring. For high heating both the rings are energized to their full capacity, while for medium heat the inner ring only is energized at only one-half voltage and provides a heating effect equal to about one-half of the full effect of the inner ring and about one-fourth of the full heating effect of the outer ring. This heating arrangement provides a greater heating effect upon the outside ring where the cooking utensils normally contact and it also provides a better selection of heating rates for normal cooking requirements. I have found that the heating capacity for medium heat should be considerably less than one-half the high heating rate and that the low heating rate should be about one-half the medium heating rate.

I have provided two identical heating units in the top and bottom of the oven and I provide an evenizer baffle over the top of the lower heating unit to make the heating of the oven much more uniform. The upper heater I use at maximum capacity for broiling, while for baking I use the lower heater at maximum capacity at the full voltage and upper heater I use at one-half voltage and, in addition, connect the upper heater in series with an external resistance which further reduces the actual voltage upon the upper heater. By this arrangement I can use an evenly distributed heater in the upper portion for both broiling and baking in order to get uniform heat distribution for either broiling or baking. I also provide a preheating arrangement by which both upper and lower heaters are operated at full voltage and maximum capacity.

Referring now to the drawings and more particularly to Fig. 1 there is shown an electric range including a range shell 20, preferably coated with porcelain inside and out, which is provided with a cooking top 22 having an integral back panel 24, all of which is coated with porcelain on both sides. The top is provided with four surface heaters 26, each provided with an outer heating ring 28 and an inner heating ring 30. These heating rings form the surface heaters and are made of different sizes and different heating rings.

For example, the inner ring may have an outer diameter of 4½" and an inner diameter of 2¼" and an upper surface area of about 12 square inches. Preferably it has a rate of 400 watts at full voltage giving it a heating density of about 33 watts per square inch. The outer ring preferably has an outer diameter of about 6½" and an inner diameter of about 4½" providing an upper surface area of about 17 square inches. Preferably this outer ring has a heating ring of about 800 watts providing a heat density of about 50 watts per square inch. This provides about 50% greater heating density in the outer ring than in the inner ring. This counteracts the tendency of surface heaters to get much hotter on the inner portions than the outer portions. I find that cooking utensils often have concave bottoms causing them to contact upon the outside ring and usually fail to make contact with the inside ring. Thus the heat will be removed from the outside ring much more easily than from the inside ring and the greater heating density provided by the outside ring will therefore compensate for its greater rate of heat transfer to keep both rings at about the same temperature.

If desired, the surface heaters may have more than two concentric heating rings with the inner ring having the least heat intensity and the outer ring having the greatest heat intensity. In such a surface heater, the intermediate heating rings preferably have an intensity intermediate the heat intensity of the inner and outer rings. If there are more than one intermediate rings their heat intensity may be graduated so that the heat intensity of the heaters increases progressively from the inner ring to the outer ring. Other types of surface heaters may also be made so as to provide greater heat intensity upon the outer edges thereof than upon the inner portions thereof. For example, surface heaters of the spiral coil type may have their coils widely spaced in their inner portion and closely spaced in their outer portions to provide greater heat intensity in the outer portions. The spacing of such coils preferably progressively decreases from the inner portions to the outer portion to provide a progressively increasing heat intensity.

The bottom of the surface heaters 26 are separated from their switches by a switch shield 32 located beneath the top cover 22 and extending generally downwardly at an angle from its front edge. A U-shaped channel 34 is connected to the shield and conducts the necessary wiring from the surface heaters to the service heater switches 84, 86, 36 and 88. These surface heater switches form a part of a switch channel assembly which includes the switch channel 38 which is fastened by screws at its opposite ends to the front portions of the range shell 20. The switch channel has the surface heater switches 84, 86, 36 and 88 fastened to its rear face and the operating shafts of the switch extend forwardly through the switch channel so that they may be provided with switch handles after a switch panel is placed over the switch panel assembly. The switch channel assembly is also provided with a fuse and fuse receptacle member 40. The wiring from the switch channel assembly is grouped together in sort of a flexible conduit 42 which extends rearwardly through a channel 44 located immediately beneath the cooking top 22 and extending from the front to the back of the range.

Directly beneath the surface heating units 26 is a large warming drawer 46 and beneath this large drawer 46 is an electric heater called a warming unit 48 by which the large drawer may be heated for keeping food which has already been prepared at a desirable temperature or it may be used to warm dishes prior to serving of a meal.

The walls of the oven proper are provided by an oven shell 50 which fits into the front of the range shell 20. The oven shell 50 is surrounded with insulation and through its rear wall extend the plug receptacle 52 and 54. The upper oven heating unit 56 plugs directly into the upper receptacle 52 while the lower oven heating unit 58 plugs into the lower receptacle 54. These upper and lower oven heating units are identical except for the fact that the lower heating unit is provided with an evenizer baffle 60 for the purpose of balancing the distribution of heat through the oven. Each of the oven heater units are of the open coil type and are designed to provide a uniform heat distribution over their entire area. They have a rating of 2000 watts at full voltage.

The oven heating units are controlled by an oven switch 62 having a knob located upon the front face of back panel 24 and the remainder of the mechanism located upon the rear of the back panel 24. As will be further explained in connection with Figs. 4 to 7 this switch provides an "off" position, a preheat position, in which both heaters are energized by full voltage to give rapid heating, and a bake position in which the lower heater is operated at full voltage and the upper heater is connected in series with the resistance and the two are operated at one-half voltage in order to provide a small evenly distributed amount of heat at the top of the oven to provide uniform heating for baking purposes. A broiling position is also provided in which the upper oven heat unit is operated alone for boiling purposes.

At one side of the oven switch 62 is the oven temperature control 64 which in reality is a thermostat which operates a set of switch contacts to control the supply of current to the oven heating units. At the side of the oven temperature control 64 there is provided a timer clock 66 which may be used to start and stop the energization of the oven heating units at any particular set time. At the side of the clock 66 is a time signal 68 which may be set to ring a bell at any particular time desired. On the other side of the oven switch 62 is an oven vent 70 which permits air, odors and vapors to escape from the oven. At the side of this vent 70 is a warmer switch 72 beneath which is a signal light 74 which is lighted whenever the upper unit is in operation. Below the signal light 74 is an appliance receptacle 76 which may be used as an outlet for an electric teakettle or percolator or the like.

The external resistance 78 for use with the upper oven heating unit 56 during baking operations is located upon the back of the range and like the other electrical parts is connected to the line terminal block 80 which is located adjacent the bottom of the range to which the supply electric conductors are connected. Preferably the range operates upon a three-wire 115–120, 230–240 volt distribution system. The electrical connections shown in Fig. 2 at the rear of the range are concealed by the rear cover 82 of the range.

Referring now more particularly to Fig. 3 which shows the wiring system of the range, the line terminal block 80 is shown connected to the surface heater switches 84, 86, 36 and 88. The connection between these switches and the line terminal block 80 is made by the conductors 42 which pass through the channel 44 provided for them. The switch 84 is connected to the left front surface heater 26 which includes the outer ring-shaped heating member 28 and the inner ring-shaped heating member 30. The switch 84 includes a knob 94 provided with a pointer 96. Four positions "off," "high," "medium" and "low" are indicated upon the switch panel.

The knob 94 is connected to a shaft 98 provided with cams 102, 104 and 106. The cam 102 operates the contact 108 which makes engagement with the stationary contact 110 for supplying current to a connection which connects with one end of each of the heating members 28 and 30. The other end of the heating member 30 is connected to the stationary contact 112 which is adapted to be contacted by the movable contact 114, which in turn is connected to the middle wiqre of the terminal block. The other end of the heater 28 is connected to a double stationary contact 116 having a contact 118 adapted to be engaged by the movable contact 120 which is connected to one of the outside conductors, while the second contact 122 is adapted to make contact with the movable contact 114 connected to the middle wire.

The other switches are connected to the left rear, right rear, and right front surface units in the same manner as is the switch 84. However, the switch 84 is shown in the "off" position, with the contact 108 away from the contact 110, and the contact 114 away from the contact 112. In this position, since only one conductor is connected to the supply line, no current can flow through any of the heaters.

When the knob 94 of the switch 84 is turned to the "high" position, the cam 102 will be turned so that its point of contact with the contact 108 will be changed from its high portion to its low portion. This will permit contact 108 to make contact with the contact 110. The cam 104 will also be rotated but the contact 114 will remain upon the high portion of the cam. The cam 106 will also move one-fourth turn in a clockwise direction so that the contact of the cam with the contact 120 will be changed from the high portion of the cam to the low portion of the cam. This will cause the contact 120 to engage the contact 118. Thus when the switch 84 is turned to the "high" position, the current from one of the outside lines will flow through the contacts 120 and 118 to the heater 28. Current from the middle supply line will flow through the contacts 114 and 112 to the heater 30. Current from the other outside supply line will flow through the contacts 108 and 110 to both the heaters 28 and 30. Thus the current flowing through the outside ring heater 28 will flow from one outside supply line to the other while the current flowing through the inner heater 30 will flow from the middle supply line to one of the outside supply lines. Thus the outside heater 28 will be supplied with the maximum voltage for which it is designed, namely, 230–240 volts, while the inner ring heater 30 will be supplied with its maximum voltage namely 115 to 120 volts. The switch 86 is shown in the "high" position.

When the knob 95 is turned to the "medium" position the contacts 108 and 110 remain closed and the contact 114 remains in engagement with the contact 112. However, the contact 120 is again moved out of engagement with the contact 113 so that no current can flow through the outside ring heater 28. Full voltage, however, is applied to the inner ring heater 30. The switch 86 is shown in the "medium" position.

In the "low" position, the contact 108 remains in contact with contact 110, but the contact 114 is moved out of engagement with the contact 112 and into engagement with the contact 122, because in this position the low portion of the cam 104 makes contact with the contact 114. In this "low" position, the contact 120 remains out of contact with the contact 118. Thus, current from the middle conductor of the three-wire system passes through the contacts 114 and 122, which forms a portion of the double contact member 116, to the outer ring heating member 28, from which the current flows through the contacts 110 and 108 to one of the outside conductors of the three-wire system. Thus when the switch 84 is in this position only one-half full voltage is applied to the outer ring heater 28 and only one-fourth the "full" heat rating is obtained from the heater 28. The switch 86 is shown in the "low" position.

Also connected to the three-wire conductors extending from the line terminal block 80 is the warmer unit 48 which is controlled by the warmer unit switch 72. The conductors to the warmer unit 48 are shown as entering an aperture 126 in the rear wall of the range in Fig. 2 and make connection with the warmer unit 48 as shown beneath the large drawer 46 in Fig. 1. The warmer unit is connected to the middle connection and one of the outside connections of the line terminal block 80 so that the warmer unit operates on 115–120 volts. The oven temperature control 64 includes the double contacts 128 connected by conductors 130 to the timer clock 68 which in turn connects to the two outside conductors connecting to the line terminal block 80. The double switch contacts 128 are connected by conductors to the binding posts 132 and 134 of the oven switch 62. The oven switch 62 is provided with a third binding post 136 connected to the external resistance 78 which in turn is connected directly to the middle conductor connected to the terminal block 80.

The upper left front and the upper right rear binding posts 138 and 140 of the oven switch 62 are connected to the terminal 54 which connects to the lower oven heating unit 58. The left rear and right front binding posts 142 and 144 of the oven switch 62 are connected to the upper terminal 52 to which is connected the upper oven heating unit 56. The signal light 74 is connected to the conductor which is connected to the binding post 142 and is also connected to one of the terminals of the appliance receptacle 76 which in turn is connected to the middle conductor connected to the line terminal block 80. The other conductor of the appliance receptacle is connected to a fuse 146 which in turn is connected to one of the outside conductors connected to the line terminal block 80.

Referring now more particularly to Figs. 4 to 7 inclusive, there is shown the oven switch 102 in its four positions connected diagrammatically to the upper and lower oven heating units 56 and 58. In Fig. 4 the oven switch is shown in the "off" position as indicated by its control knob 150. The knob 150 is connected to one end of a cam shaft 152 which is provided with cams 154, 156, 158, 160 and 162 arranged upon the shaft 152 in order. The cam 154 is contacted by the contact member 164 which is adapted to make contact with the stationary contact 166 connected to the external resistance 78. The high portion of the cam 154 is in contact with the contact 164 at all times except when the knob 150 is turned to "bake" position as is shown in Fig. 6, at which time the contact 164 will be engaged with the low portion of the cam 150 to permit the contacts 44 and 166 to close.

The cam 156, which is next in line, is engaged by the contact 168 which is adapted to make contact with the stationary contact 170 forming a part of a contact bar 172 which it shares with the stationary contact 174. The high portion of cam 156 remains in engagement with the contact 168 keeping it in open position in the "off" and "high" positions, but in the preheat and baking positions contact 168 is engaged with the low portion of the cam 156 so that it makes contact with the stationary contact 170. The contact 168 is on the same side of the shaft as the contact 176 which is operated by the cam 160. When the knob 150 is turned to the preheat and bake positions the contact 176 is in contact with the low portions of the cam 160 so that the contact 176 is in engagement with the contact 174 upon the contact bar 172 at the same time when the contact 168 is in contact with contact 170 upon the other end of the contact bar 172. However, in the "broil" position the contact 176 is also in engagement with the low portion of the cam 160 so that it remains in engagement with the contact bar 172 while the contact 168 is moved away from contact bar 172 by the high portion of its cam 156.

Upon the other side of the cam shaft 152 is another contact bar 180 provided with a stationary contact 182 adapted to make contact with a movable contact 184 which is operated by the cam 158. The other stationary contact 186, upon the contact bar 180 is adapted to be contacted by the movable contact 188 which is operated by the cam 162. In the preheat position the low portion of the cams 158 and 162 are in contact with the movable contacts 184 and 188 so that both of these contacts are in conducting relation with the contact bar 180 which is connected to one outer conductor connected to the line terminal block. When the knob 150 is turned to the "bake" position, the cam 158 has its high portion in engagement with the movable contact 184 thus disengaging it from its stationary contact 182 upon the contact bar 180. The cam 162, however, has its low portion in engagement with the movable contacts 188 so that it remains in contact with its stationary contact 186. In the "broil" position of the knob 150, the situation is reversed and the low portion of the cam 158 engages the movable contact 184 permitting it to contact the stationary contact 182 while the high portion of the cam 162 is engageable with the movable contact 188 to separate it from its stationary contact 186.

Thus it will be seen in the "off" position all of the contacts are separated from their cooperating contacts to prevent any energization of the heaters. In the "preheat" position one of the outside conductors connecting to the line terminal block is connected through contact bar 172 with both the movable contacts 168 and 176 to supply electric energy at full voltage to both the upper and lower heating units 56 and 58. The upper oven heating unit 56 is also connected through a common conductor 190 to the movable contact 184 and through the common conductor bar 180 to the other side of the three-wire system connected to the line terminal block. The lower oven heating unit 58 is also connected to the movable contact 188 which engages the common contact bar 180 connected to the other outside conductor of the three-wire conducting system connected to the line terminal block 80. Thus it will be seen that in the "preheat" position the heating units have one end connected to the common contact bar 172 while the other end is connected to the common contact bar 108.

In the "bake" position shown in Fig. 6 one of the outside conductors is connected to the common contact bar 172 and through this bar to the movable conductor 168 and to the lower oven heating unit 58 which in turn is connected through the movable conductor 188 to the other common contact bar 180. In this control position the common contact bar 172 is also contacted by the movable contact 176 which connects to the upper oven heating unit 56 which in turn is connected to the common conductor 190 which is connected to the movable contact 164 which inturn engages the contact 166 connected to the external resistance 78 to apply the 115-120 volts to the upper oven heating unit 56 and the resistance 78 so that the heat output of the upper oven heating unit will be reduced to about 250 watts.

In the "boil" position shown in Fig. 7, common contact bar 172 is engaged by the movable contact 176 which permits current to flow to the upper oven heating unit 56 which is connected to the common conductor 190 and to the movable conductor 184 which contacts the common contact bar 180 so that in this position full voltage is applied to the upper oven heat unit 56 for broiling purposes. In this position all the other contacts are in open position.

By this particular heating arrangement for the oven, the top heating coils for both broiling and baking are evenly distributed over the top of the oven so that the heat at the top of the oven is evenly distributed over the entire top of the oven for both broiling and baking. This particular arrangement avoids using separate sections of the upper heating unit for broiling and baking purposes. Obviously this particular arrangement provides improved broiling and baking conditions.

I have provided two similar heating units in the top and bottom of the oven and I provide a baffle over the top of the lower heating unit to shield the lower shelves from the radiant heat and to provide a gentle circulation of the warm air in the oven to make the heating of the oven much more uniform. This baffle is of a peculiar shape and is inclined upwardly from its center portion toward its outer edges. It is provided with a long downwardly flanged opening extending generally from front to rear, in order to provide a passage through which air from the upper portion of the oven may readily enter the space beneath the baffle. The lower heating unit is entirely covered by the baffle and surrounds the flanged opening in the baffle. The upper heating unit I use at a maximum capacity for broiling, while for baking I use the lower heating unit at maximum capacity at the full voltage, and the upper heating unit I use at one-half voltage and in addition connect the upper heating unit in series with an external resistance which further reduces the actual voltage applied to the upper heating unit. The heating units are provided with an arrangement creating a greater heat intensity at their front and rear edges. By this arrangement I provide an even distribution of heat in the upper portion of the oven for either broiling or baking. I also provide a heating arrangement by which both upper and lower heaters are operated at full voltage and operated at maximum capacity for rapid heating.

While the low intensity, distributed heat in the top of the oven is a great aid in providing uniform distribution of heat, it is of primary importance that the lower oven heating unit be provided with properly distributed heat and be baffled in the most efficient manner. Referring now more particularly to Figs. 8 to 13, the lower heating element is shown as formed generally of an upper relatively flat general rectangular wire frame member 220 having a projecting portion at its rear edge which supports the electrical plug 222 for connecting the heating unit 58 to its plug receptacle 54. The heating unit 58 is also provided with a lower general rectangular wire frame in the form of a loop 224 which is bent downwardly at its side edges so that it may be engaged within the slideways 226 and 228 provided upon opposite sides of the bottom of the oven shell for holding the lower heating unit in place.

Extending between the front and rear portions of the wire frame members 220 and 224 are the channel members 230 which are formed of sheet steel. These channel members 230 include a web portion 232, upper and lower flanged portions 234 and 236, and these flanged portions have their edges turned inwardly as designated by the reference characters 238 and 240, so as to receive the rectangular insulating blocks 242 which are provided with central apertures 244. These channel members 230 therefore form a slideway for these insulating blocks 242. At uniformly spaced distances each of the channel members is provided with a rectangular opening 246 which is just slightly wider than the insulating block. Each of these flanged openings registers with the opening in its respective insulating block 242. The edges of the openings 246 are pressed inwardly as designated by the reference characters 248 and 250 in order to locate the insulating blocks in place within the confines of the channel members so as to prevent lateral movement and to hold them in alignment with the apertures 246 in the web of the channels 230. The web 232 of the channels 230 are provided with rectangular notches 252 at each corner thereby leaving the protruding end portions 254 and 256 which are bent around the front and rear portions of the upper and lower wire frame members 220 and 224 which are provided with flattened portions or notches 258 in order to hold the channels in position.

The electric heating unit is provided with an electrical resistance heating element in the form of a coiled resistance wire having such a resistance as to provide 2000 watts at 235 volts. This coiled resistance wire has its opposite ends connected to the plug 222 and is threaded through the insulating blocks 232. It should be noted that the coiled resistance wire does not extend across from one side of the center to the other except in the front of the heater where a single coil of resistance wire extends from one side to the other in order to connect the two sides in series with each other. It should be noted that the resistance wire is not coiled uniformly but that a single pass adjacent the rear edge of the heater on either side of the plug 222 and designated by the reference characters 260 and 262 is coiled considerably closer together than the portion 266 and 268 of the resistance wire in between the portions 260 and 262 and the portion 264. This last mentioned portion 264 is closely coiled like the portions 260 and 262 and extends completely across the heater from one side to the other at its front edge and forms the connecting pass between the two sides of the heater.

The coils of wire are so stretched that the portion of the coil between the portion 260 and the portion 264 has a resistance of about 7.4 ohms and likewise the portion between the closely coiled portion 262 and the closely coiled portion 264 also has a resistance of about 7.4 ohms. The portion 264 has a resistance of about 5.3 ohms and the portions 260 and 262 each have a resistance of about 2.6 ohms. It will therefore be seen that the heat intensity is concentrated at the front and rear edges of the heating unit where the greatest amount of heat is desired in order to obtain substantially uniform temperature conditions throughout the oven. Thus in order to secure the desired distribution of heat intensity, the portions 260, 262 and 264 have their coils only about one-half as far apart as the portions 266 and 268 which are located between the closely coiled portions. Thus I provide a distribution wherein about 20% of the heat is provided at the front and substantially the same proportion at the rear edge of the heater and slightly less than 60% of the heat is provided in between the front and rear edges.

In order to provide a satisfactory distribution of heat from the lower heating unit 58 I provide the baffle 60 directly above it. This baffle is supported by four supports 270 which are fastened to the front and rear edges of the baffle 60 adjacent the corners and extend downwardly and are fastened to the front and rear edges of the upper wire frame member 228. This baffle 60 has its outer edges 272 curled downwardly a small distance providing a reinforcement for its edges and at its center portion it is provided with a deeply flanged aperture 274 which is flanged downwardly a considerable distance very nearly to the level of the coiled resistance wire. The baffle 60 slopes upwardly on either side of the long flanged aperture 274 at a uniform slope of about 5°. This baffle provides a means of protecting the food on the lower shelves of the oven from obtaining too much radiant heat from the lower heating unit. Thus this baffle serves as a shield since it completely covers the portions of the heating unit which contain the coiled resistance wire.

It also serves as a means to promote a gentle evenly distributed circulation. Thus the uniform slope of the baffle on each side of the flanged aperture 274 produces a circulation of warm air laterally under each side of the baffle and upwardly along the side walls and then to distribute itself through the interior of the oven. The flanged aperture 274 provides a means by which the air when slightly cooled may be returned to the lower heater beneath the baffle. The deep flange of the flanged aperture 274 tends to prevent, to a certain extent, any warm air from passing upwardly through it instead of passing laterally beyond the side edges of the baffle. I find that this deeply flanged aperture in the center of the baffle increases the rate of circulation over baffles which have previously been used thereby avoiding the trapping of heat beneath the baffle, and thus provides a much more even distribution of heat in the oven. This baffle is not only useful with the two unit type of oven shown in the drawings, but may also be used with the single unit type of oven where space is provided for broiling beneath the lower heating unit.

As mentioned before the upper heating unit 56 is identical to the lower heating unit 58 excepting that it is inverted. It is supported in slideways 276 and 278 provided upon the top wall of the oven, which slideways are similar to the slideways 276 and 278 provided in the bottom. The increased heat intensity at the edges of the upper unit 56 provides much better broiling conditions than prevails in other heating units and also provides better baking conditions. The side walls of the oven are provided with projections 280 which form supports and guides for the shelves 282. Thus by providing a lower oven heating unit with about 40% of its heating capacity located upon its front and rear edges and by providing this greatly improved form of baffle, and also by providing a properly distributed small amount of heat at the top of the oven I have provided an oven which provides much more uniform heating than has heretofore been accomplished with an arrangement of this type.

Figure 8:
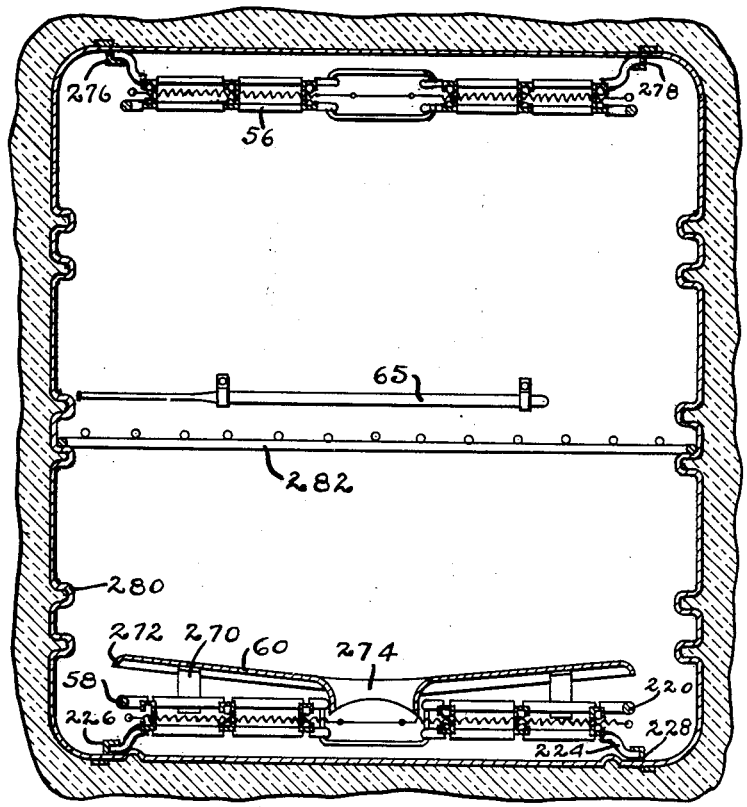
Fig. 8 is a vertical transverse sectional view through the oven, both heating elements and the baffle.
Figures 9, 10:
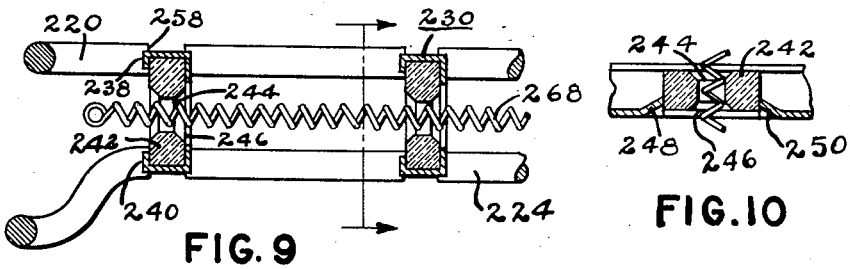
Fig. 9 is an enlarged sectional view of a portion of the lower heating means shown in Fig. 8.
Fig. 10 is a sectional view through one of the insulators taken along the lines 10—10 of Fig. 11.
Figure 11:
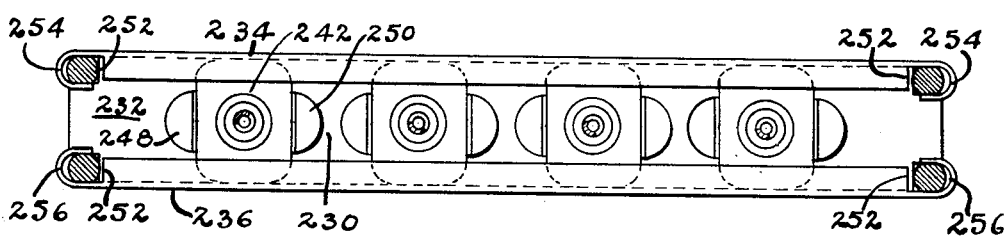
Fig. 11 is a sectional view of a portion of the heating means shown in Fig. 9 taken along the lines 11—11 of Fig. 9.
Figure 12:
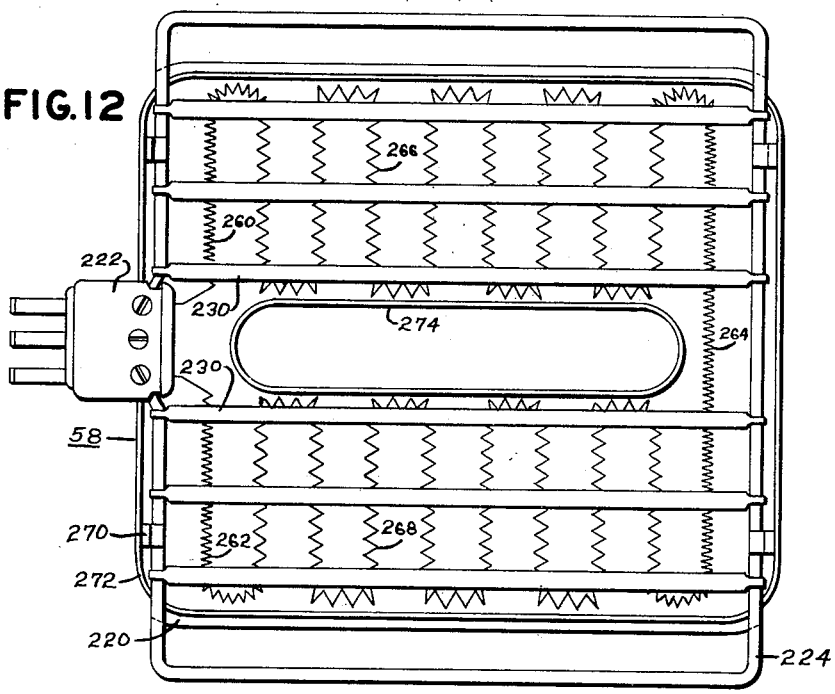
Fig. 12 is a plan view of one of the heating units for the oven, the upper and lower heating units of which may be made identical.
Figure 13:
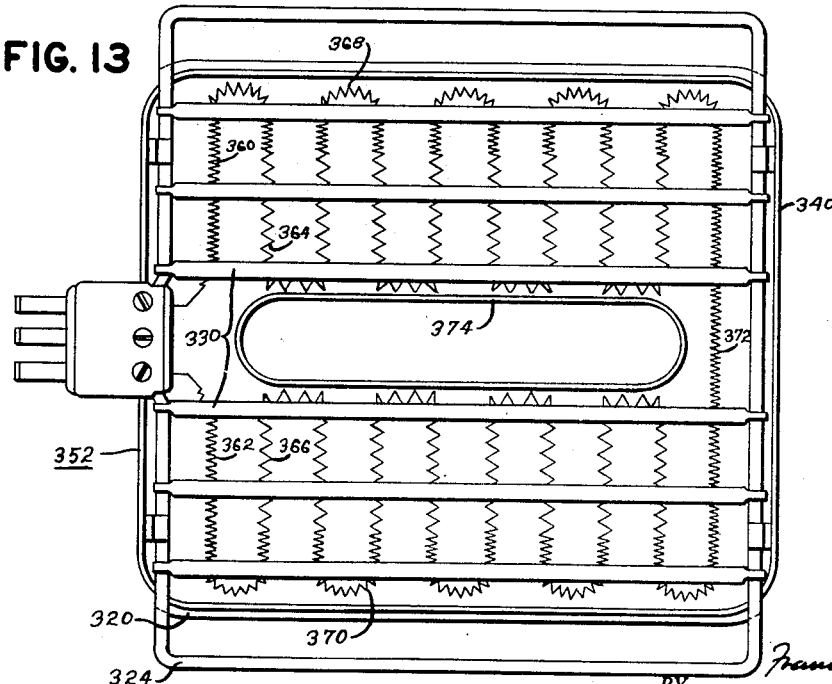
Fig. 13 is a modified form of the heating means shown in Fig. 12, made so as to provide a greater amount of heat at all of the edges.

In Fig. 13 is shown a modified form of heating unit designated by the reference character 352 which is formed of the upper and lower rectangular wire frame members 322 and 324 which are provided with channel members 330 extending from front to rear as in the heating unit 58. These channel members are constructed like the channel members of the heating unit 58. The coiled electrical resistance wire is threaded through the insulators supported by the channel members 330 in a fashion like that shown in Fig. 12 for the lower heating units 58.

This coiled resistance wire differs from that shown in Fig. 12 by having closely coiled portions 360 and 362 at the rear edge of the heating unit which extend not only across the rear edge of the heating unit but these closely coiled portions extend to form a loop upon the side of the heating unit. Connected to the closely coiled portions 360 and 362 are the loosely coiled portions 364 and 366 which form loops on the inner portions of the heating unit. These loosely coiled portions are then connected to closely coiled portions 368 and 370 which form loops at the outer edge of the heating unit. The resistance element then continues in alternate loosely coiled and closely coiled portions with the loosely coiled portions forming the inner loops, while the closely coiled portions form the outer loops until the front of the heating unit is reached, where a closely coiled portion 372 is provided which extends entirely across the front of the heating unit and also forms loops at the outer edges of the heating unit.

Thus with this form, the heating unit is provided with closely coiled portions at the front and rear as well as in the loops on the outer edges, while the loops on the inner portions of the heating unit are loosely or widely coiled. This provides a greater amount of heat at all the edges of the heating unit and a lesser amount of heat in the central portions of the heating unit. Thus this form creates more heat at the edges, and in this way provides more uniform temperature distribution which is advantageous for broiling as well as baking. This modified form of heating may be used like the heating unit 58 in either the single or two unit oven. It may be used with a similar baffle 340 provided with a deep downwardly flanged aperture 374. It may also be used as the upper heating unit in connection with a lower heating unit like that of Fig. 12. If desired, a different baffle may be used or a different slope employed such as 10°.

From the foregoing description of the oven heating system, it is to be seen that I have provided a system in which upper and lower oven electric resistance heater units are controlled by a unitary manual switch. The upper heater is primarily suitable for broiling purposes when applied to full voltage. The lower electric heater unit is primarily suitable for baking purposes when applied across the full voltage. I connect the heaters to electric supply means in such a manner that the upper heater unit is used alone across the full voltage for broiling purposes, while for baking purposes the upper heater unit is placed across a reduced voltage simultaneously energized with the lower heating unit with the full voltage across the lower unit.

In the foregoing description I have indicated how these oven heating units may be applied to a three-wire circuit; but other modifications are possible with both three-wire and two-wire circuits. Such modifications are diagrammatically indicated in Figs. 14 to 19 inclusive.

Figure 14:
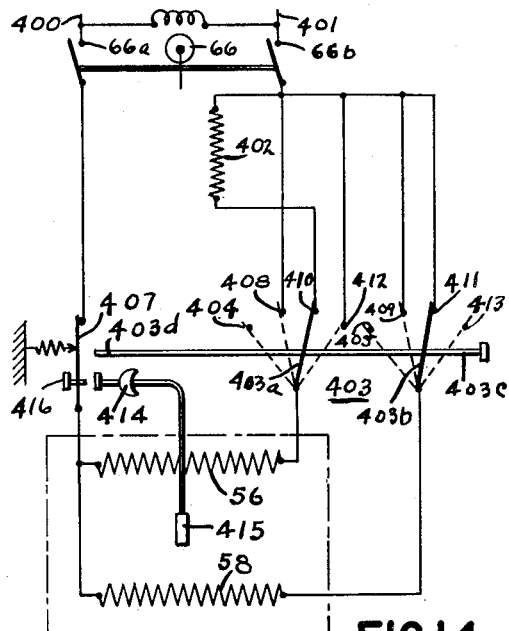

In Fig. 14 the upper and lower heating units are shown at 56 and 58. A two-line source of electrical supply is indicated by the wires 400 and 401. A resistance 402 may be placed outside of the oven, and a multiple switch 403 with a single manual control is provided for regulating the energization of the oven units. The arrangement is such that switching mechanism 403 can disconnect the units 56 and 58 completely from the source of supply, can place both units across the full voltage for preheat, can place the lower unit 58 across the full voltage with the upper unit 56 across a reduced voltage for baking, and can place the upper unit 56 alone across the full voltage for broiling. The switch structure may be of any desired unitary construction such that the necessary contacts can be manipulated from a single handle. This structure, for example may include movable contacts 403a, 403b interlocked by manipulating arm 403c. When the movable contacts 403a and 403b are over stationary contacts 404 and 405, the switch is in the "off" position. At this time the extension 403d of arm 403c impinges upon, and opens, the switch 407 thereby disconnecting both sides of the units 56 and 58 from the wires 400 and 401. When movable contacts 403a and 403b are moved over stationary contacts 408 and 409, arm extension 403d is moved away from switch 407 and switch 407 closes, and the units 56 and 58 are placed across the full voltage in parallel across the wires 400 and 401. In this position of the switch, the units are at the maximum heating capacity and are to be used for preheating the oven. When the movable contacts are placed over the contacts 410 and 411, the switch 407 remains closed, the lower unit 58 is across the full voltage, and the upper unit 56 is across a reduced voltage by being placed in series with the resistance 402. In this position the units are suitably energized for baking. When the movable contacts are placed over the contacts 412 and 413, the switch 407 remains closed, and the upper unit 56 alone is placed across the full voltage of the wires 400 and 401. This is suitable for broiling.

If desired, an adjustable thermostat having a diaphragm or bellows 414 may be connected to a bulb 415 in the oven in such a manner that the expansion of the bellows 414 by the thermostatic liquid, such as chlorinated diphenyl, opens a switch, such as 407, when the oven reaches a predetermined temperature. By adjusting the impingement or contact screw 416, the operating distance of the bellows may be varied so that the opening temperature of the switch may be varied or selected to suit the user. Also, if desired, an electric clock mechanism 66 may be provided which may be set to close the contacts 66a and 66b at a predetermined time and to open them at a later predetermined time, thus providing for an automatic baking operation of selected time and duration.

Figure 15:
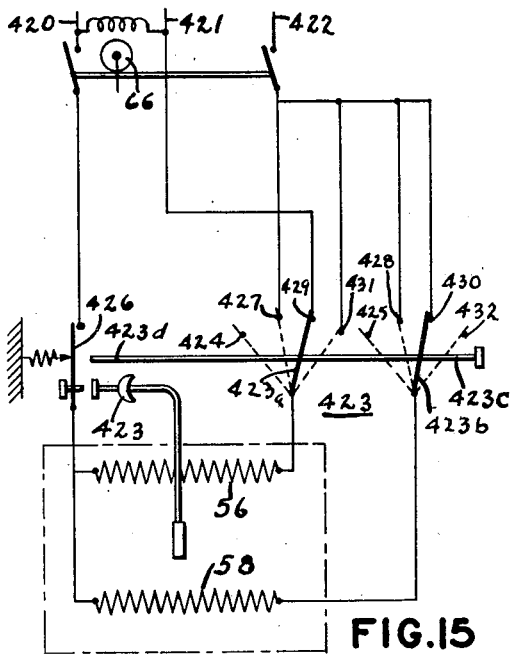

In Fig. 15 the oven units 56 and 58 are connected to a three-wire source including wires 420, 421 and 422. This may be the usual three-wire alternating current supply with wire 421 as the "neutral" wire. The arrangement is such that the switch structure 423 may place both units across the full voltage of wires 420 and 422 for preheat, the lower unit 58 across the full voltage of wires 420 and 422, with the upper unit 56 across the reduced voltage between either of the line wires 420 or 422 and the neutral wire 421 for baking, and the upper unit 56 alone across the full voltage between the wires 420 and 422 for broiling. For example, when the movable contacts 423a and 423b are placed over the stationary contacts 424 and 425 by manipulating interlock arm 423c, arm extension 423d impinges on, and opens switch 426, so that the units 56 and 58 are completely disconnected from the live wires. When the movable contacts 423a and 423b are placed over contacts 427 and 428 by means of manipulating interlock arm 423c, switch 426 is closed because extension 423d is retracted from switch 426. At this time, both units 56 and 58 are placed across the full voltage between wires 420 and 422 thus rendering them suitable for preheating the oven. When the movable contacts 423a and 423b, are placed over contacts 429 and 430, switch 426 remains closed and the lower unit 58 is placed acros the full voltage between line 420 and line 422 with the upper unit across the reduced voltage between the lines 420 and 421. The units are suitably energized for baking in this position. When the movable contacts 423a and 423b are placed over the contacts 431 and 432, switch 426 remains closed and the upper unit 56 alone is placed across the full voltage of lines 420 and 422 and is suitably energized for broiling. In this modification also, a thermostat 433 is provided similar in function, adjustment etc., to the thermostat shown in Fig. 14. The clock mechanism 66 may also be provided.

Figure 16:
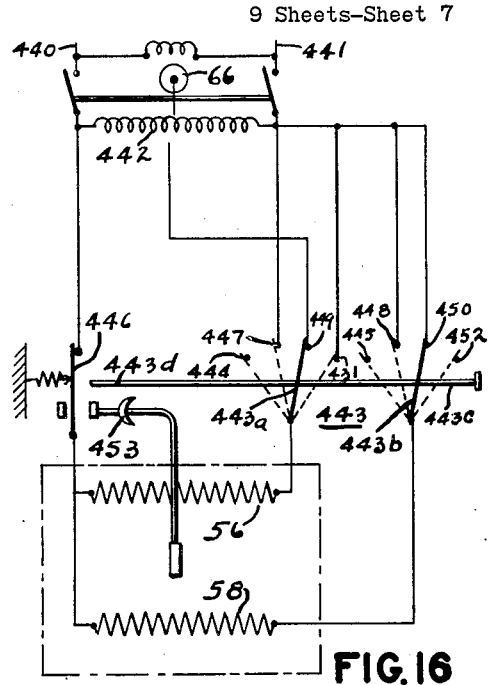

In Fig. 16 an arrangement is shown for energizing the units 56 and 58 by means of the two-wire source 440 and 441, utilizing an autotransformer 442. When the switch structure 443 is placed with its movable contacts 443a and 443b over contacts 444 and 445, the system is in the "off" position, with the switch 446 opened by extension 443d of interlock 443c and with the units 56 and 58 completely disconnected from the electrical supply. When the movable contacts 443a and 443b are placed over contacts 447 and 448, the switch 446 is closed, and the units 56 and 58 are placed in parallel across the full voltage of lines 440 and 441 and are suitably energized for preheating. When the movable contacts 443a and 443b are placed over contacts 449 and 450, switch 446 remains closed, lower unit 58 is placed across the full voltage of lines 440 and 441, and the upper unit 56 is placed across a reduced voltage extending from the line 440 to a selected point in the autotransformer 442. The units are suitably energized for baking in this position. If desired, autotransformer 442 may be made adjustable so that any desired energization of the upper unit may be obtained. When the movable contacts 443a and 443b are over contacts 451 and 452, the upper unit 56 alone is placed across the full voltage of the wires 440 and 441 and is suitably energized for broiling. A thermostat 453 may be provided, is similar in construction, adjustment etc., to the thermostat shown in Fig. 14. The clock mechanism 66 may also be provided.

Figure 17:
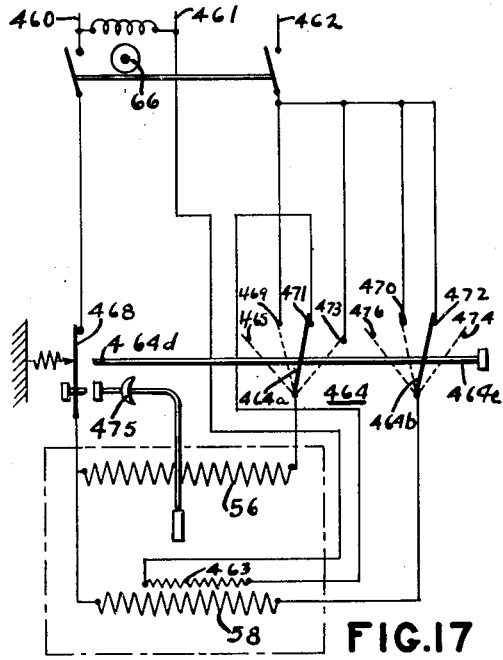

In Fig. 17 the units 56 and 58 are connected to a three-wire source 460, 461 and 462. In this arrangement a resistance 463 is placed adjacent to the lower unit 58, and may be built structurally integrally therewith. This resistance may be placed in series with the upper unit 56 across the reduced voltage of 460 and 461 when the switch arrangement about to be described is placed in the "bake" position. When the movable contacts 464a and 464b of the switch structure 464 are placed over the contacts 465 and 467 by means of the manipulating interlock 464c, the switch 468 is opened by arm extension 464d and the switch structure is in the "off" position completely disconnecting the units 56, 58 and 463 from the electric source of supply. When the movable contacts 464a and 464b are placed over the contacts 469 and 470, the switch 468 is closed and the units 56 and 58 are placed acros the full voltage of lines 460 and 462 and are suitably energized for preheating the oven. When the movable contacts 464a and 464b are placed over the contacts 471 and 472 the lower unit 58 is placed across the full voltage 460 and 462 while the upper unit 56 is placed in series with the resistance 463 across the reduced voltage 460 and 461. This is suitable energization for baking. When the movable contacts 464a and 464b are placed over contacts 473 and 474, the upper unit 56 alone is placed across the full voltage of lines 460 and 462 and is suitably energized for broiling. A thermostat 475 is provided, which may be similar in construction, adjustment etc., to the thermostat shown in Fig. 14. The clock mechanism 66 may also be provided.

Figure 18:
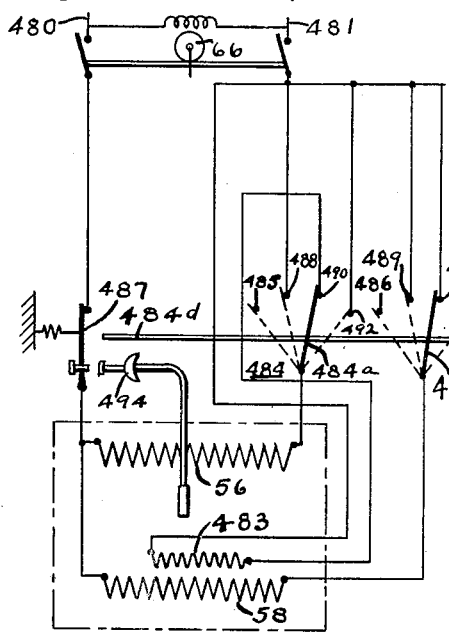

In Fig. 18, the units 56 and 58 are connected to a two-wire source 480 and 481. A resistance 483 may be provided adjacent to, and if desired integrally built into, unit 58. When the movable contacts 484a and 484b of the switch structure 484 are placed over the contacts 485 and 486 by the manipulating interlock arm 484c, switch 487 is opened by the extension 484d and the arrangement is in the "off" position with all of the units completely disconnected from the electrical supply. When the movable contacts 484a and 484b are over contacts 488 and 489, switch 487 is closed and both units 58 and 56 are placed in parallel across the full voltage 480 and 481 and are suitably energized for preheating the oven. When the movable contacts 484a and 484b are placed over contacts 490 and 491, the lower unit is placed across the full voltage 480 and 481 with the upper unit 56 placed in series with the resistance 483 across 480 and 481 to impose a reduced voltage on the unit 56. The units are suitably energized for baking in this position. When the movable contacts 484a and 484b are placed over contacts 492 and 493 the upper unit 56 alone is placed across the full voltage 480 and 481 and is suitably energized for broiling. A thermostat 494 may be provided similar in construction, adjustment etc., to the thermostat shown in Fig. 14. The clock mechanism 66 may also be provided.

Figure 19:
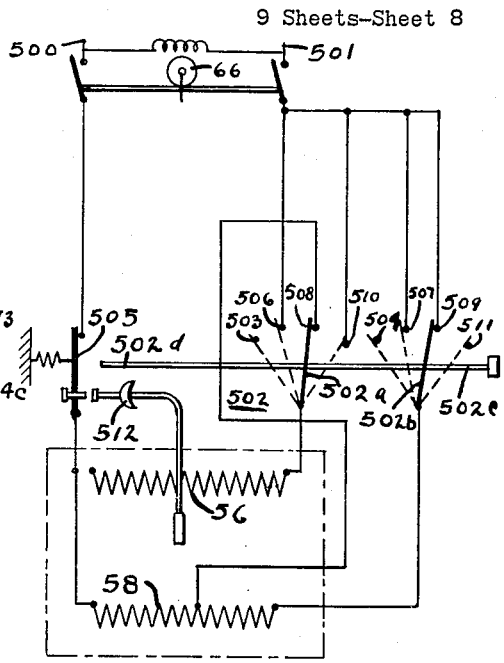

In Fig. 19 the units 56 and 58 are connected with the two-wire source 500 and 501. In this modification a reduced voltage is imposed on the upper unit 56 in the baking position by placing it in series with a portion of the lower unit 58, thus using a portion of the lower unit 58 as a resistance. When the movable contacts 502a and 502b of the switch structure 502 are placed over the contacts 503 and 504 by the manipulating interlock 502c, the switch 505 is opened by extension 502d and the units 56 and 58 are completely disconnected from the source of electrical energy, the switch structure being in the "off" position. When the movable contacts 502a and 502b are placed over contacts 506 and 507, switch 502 is closed, the units 56 and 58 are placed across the full voltage 500 and 501 and are suitably energized for preheating the oven. When the movable contacts 502a and 502b are placed over contacts 508 and 509, the lower unit 58 is placed across the full voltage 500 and 501 while the upper unit 56 has a reduced voltage imposed on it by placing it in series with a portion of the lower unit 58 across the lines 500 and 501. This suitably energizes the units for baking. When the movable contacts 502a and 502b are placed over contacts 510 and 511 the upper unit 56 alone is placed across the full voltage 500 and 501 and is suitably energized for broiling. A thermostat 512 is provided which is similar in construction, adjustment etc., to the thermostat shown in Fig. 14. The clock mechanism 66 may also be provided.

In the description of Figs. 14, 16, 17 and 18, a two-wire source has been referred to; but it is understood that this two-wire source may be two selected wires of a three or more wire source.

Referring more particularly to Figs. 20 and 21, the switch shield 32 and the U-shaped channel 34 provide a protected conduit under the cover 22 for the wires 84a, 86a, 36a, and 88a leading from the switches 84, 86, 36 and 88 and terminating centrally with respect to the surface heaters 26 so that the wires may be flexibly connected to the respective heaters 26 as indicated. This protects the wires from spillage, and at the same time allows the heaters 26 to be lifted or tilted from the cover 22 a sufficient distance for cleaning the heaters and stove. The U-shaped channel 34 prevents the wires from moving under the surface heaters where they might be damaged by spillage. The unenergized portions of the heaters 26 may be grounded to the channel 34 by wires 26a.

The switch channel 38 may be covered by an enameled plate 38a, through which the switch stems 38b extend. Switch knobs 38a are pushed on the stems 38b.

While the forms of embodiment of the invention as hereindisclosed, constitute preferred forms, it is to be understood that other forms might be adopted as may come within the scope of the claims which follow.

What is claimed is as follows:

1. In an electric circuit for cooking appliances having a source of electric power, the combination of a multi-part baking element, a broiling element, and switching means arranged in one position thereof to connect both said elements to the source, in another position thereof to connect only one part of said multi-part element and said broiling element to the source in parallel, and in a third position to connect only said broiling element to the source.

2. In an electric circuit for cooking appliances having a source of electric power, the combination of a multi-part baking element, a broiling element, and switching means arranged in one position thereof to connect one part of said multi-part element to the source in series circuit with said broiling element and another part of said multi-part element in parallel therewith, in another position thereof to connect only one part of said multi-part element to the source and said broiling element in parallel therewith, and in a third position to connect only said broiling element to the source.

3. In an electric circuit for cooking appliances having a source of electric power, the combination of a multi-part baking element adapted to be located in the lower portion of the appliance, one part of said element having a predetermined resistance value independent from the other, a broiling element adapted to be located in the upper portion of the appliance, and switching means arranged in one position thereof to connect said predetermined resistance part to the source in series circuit with said broiling element and said other part in parallel therewith, in another position thereof to connect only said other part to the source and said broiling element in parallel therewith, and a third position to connect only said broiling element to the source.

4. A range comprising an oven, an upper electrical resistance, a main lower electrical resistance, an auxiliary lower electrical resistance, a three-wire power source having two live wires and an intermediate wire, a control connecting said upper and main lower resistances in parallel to said live wires in preheat position, connecting said upper resistance alone to said live wires in broil position, connecting said upper and auxiliary lower resistance in series to one of said live wires and said intermediate wire with said main lower resistance connected to said live wires in bake position, and deenergizing said resistances in off position.

5. A range comprising an oven, an upper electrical resistance, a main lower electrical resistance, an auxiliary lower electrical resistance, a three-wire power source having two live wires and an intermediate wire, a control connecting said upper and main lower resistances in parallel to said live wires in preheat position, connecting said upper resistance alone to said live wires in broil position, connecting said upper and auxiliary lower resistance in series to one of said live wires and said intermediate wire with said main lower resistance connected to said live wires in bake position, and deenergizing said resistances in off position, and a thermostatic switch responsive to oven temperatures also controlling said resistances.

FRANCIS H. McCORMICK.

REFERENCES CITED

The following references are of record in the file of this patent:

UNITED STATES PATENTS

| Number | Name | Date |
|---|---|---|
| 1,350,895 | Thomson | Aug. 24, 1920 |
| 2,218,778 | Weimer | Oct. 22, 1940 |

FOREIGN PATENTS

| Number | Country | Date |
|---|---|---|
| 450,082 | Great Britain | July 9, 1936 |